United States Patent
Rheinegger et al.

(10) Patent No.: US 11,624,013 B2
(45) Date of Patent: Apr. 11, 2023

(54) USE OF TOUGHNESS IMPROVERS FOR INCREASING THE MAXIMUM LINEAR EXPANSION OF SINGLE-COMPONENT HEAT-CURING EPOXY RESIN COMPOSITIONS

(71) Applicant: SIKA TECHNOLOGY AG, Baar (CH)

(72) Inventors: Urs Rheinegger, Regensdorf (CH);
Elyes Jendoubi, Suzhou (CN);
Dominique Gallo, Otelfingen (CH);
Christian Krüger, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 229 days.

(21) Appl. No.: 16/771,748

(22) PCT Filed: Dec. 18, 2018

(86) PCT No.: PCT/EP2018/085494
§ 371 (c)(1),
(2) Date: Jun. 11, 2020

(87) PCT Pub. No.: WO2019/121681
PCT Pub. Date: Jun. 27, 2019

(65) Prior Publication Data
US 2021/0071051 A1 Mar. 11, 2021

(30) Foreign Application Priority Data
Dec. 19, 2017 (EP) .................................. 17208667

(51) Int. Cl.
*C09J 163/00* (2006.01)
*C08G 18/12* (2006.01)
(Continued)

(52) U.S. Cl.
CPC ............ *C09J 163/00* (2013.01); *C08G 18/12* (2013.01); *C08G 18/286* (2013.01);
(Continued)

(58) Field of Classification Search
CPC ...................................................... C09J 163/00
See application file for complete search history.

(56) References Cited

U.S. PATENT DOCUMENTS

2015/0045510 A1* 2/2015 Braendli ................. C09J 175/04
525/111
2016/0272750 A1* 9/2016 Voci .................... C08G 18/4854

FOREIGN PATENT DOCUMENTS

EP 1 916 270 A1 4/2008
EP 1 916 272 A1 4/2008
(Continued)

OTHER PUBLICATIONS

Jun. 23, 2020 English Translation of International Preliminary Report on Patentability issued in International Patent Application No. PCT/EP2018/085494.
(Continued)

*Primary Examiner* — Michael M Dollinger
(74) *Attorney, Agent, or Firm* — Oliff PLC

(57) ABSTRACT

Methods in which toughness improvers based on terminally blocked polyurethane prepolymers are used to increase the maximum linear expansion of single component heat-curing epoxy resin compositions, in particular for joining substrates having different thermal expansion coefficients, in particular in the framework of transport agents or white goods.

17 Claims, 4 Drawing Sheets

(51) Int. Cl.
    *C08G 18/28*     (2006.01)
    *C08G 18/48*     (2006.01)
    *C08G 18/69*     (2006.01)
    *C08G 18/75*     (2006.01)
    *C08G 59/40*     (2006.01)

(52) U.S. Cl.
    CPC ..... *C08G 18/2865* (2013.01); *C08G 18/4845* (2013.01); *C08G 18/69* (2013.01); *C08G 18/755* (2013.01); *C08G 59/4021* (2013.01)

(56) References Cited

FOREIGN PATENT DOCUMENTS

| | | |
|---|---|---|
| EP | 2 110 397 A1 | 10/2009 |
| JP | H05-155973 A | 6/1993 |
| WO | 2016/139117 A1 | 9/2016 |

OTHER PUBLICATIONS

Jun. 26, 2019 Search Report issued in International Patent Application No. PCT/EP2018/085494.

\* cited by examiner

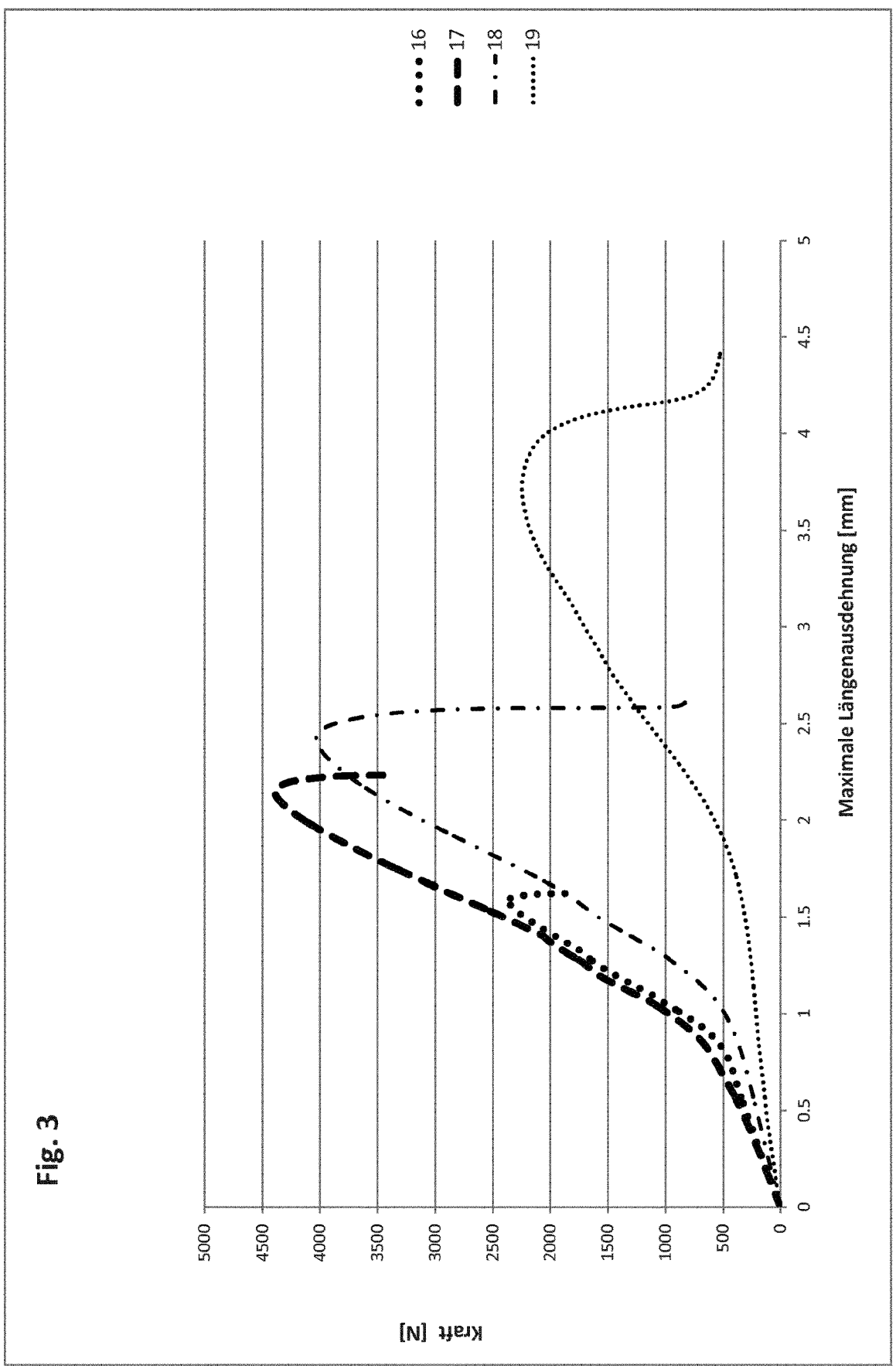

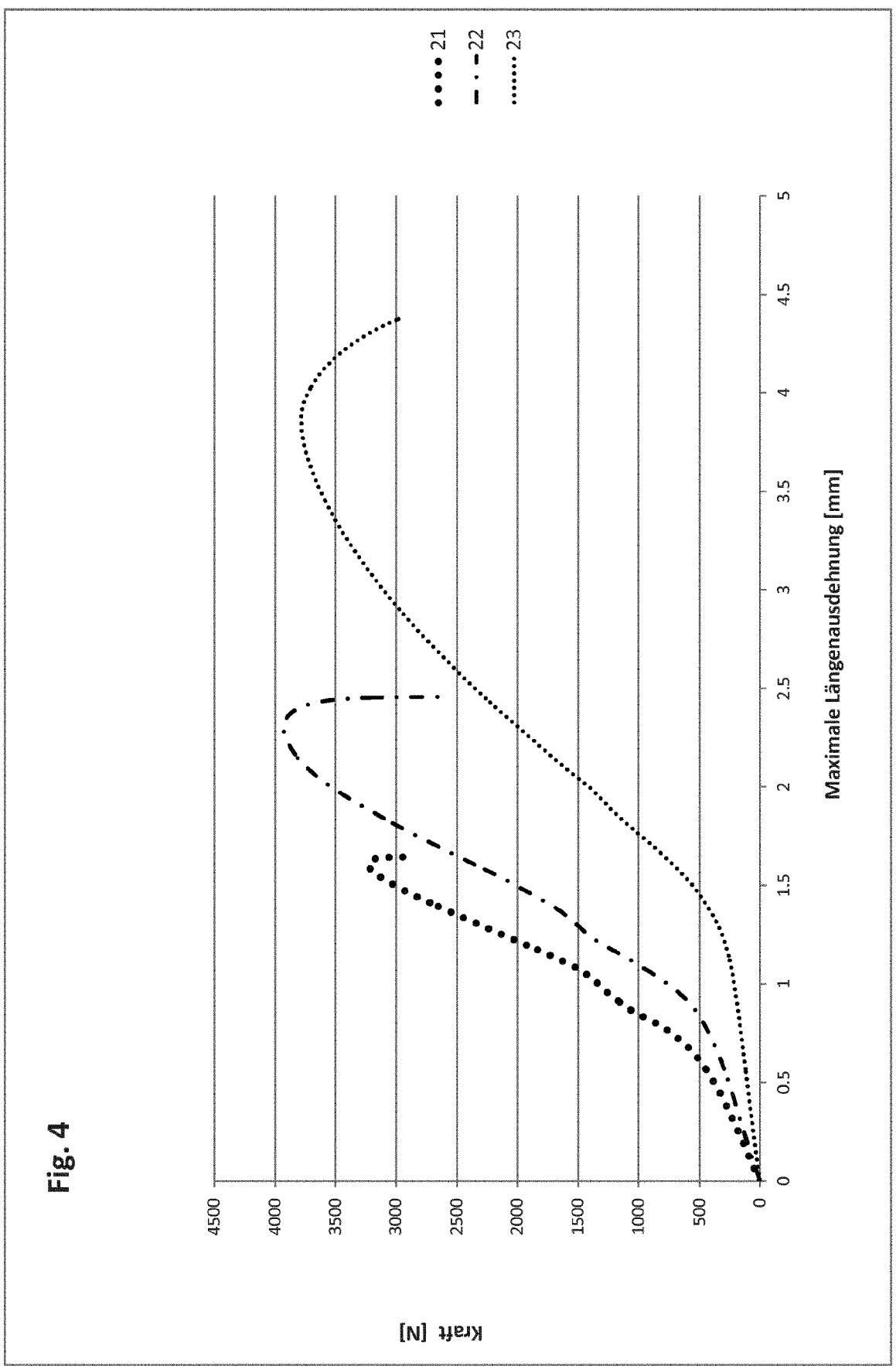

USE OF TOUGHNESS IMPROVERS FOR INCREASING THE MAXIMUM LINEAR EXPANSION OF SINGLE-COMPONENT HEAT-CURING EPOXY RESIN COMPOSITIONS

TECHNICAL FIELD

The invention relates to the field of thermosetting epoxy resin compositions, especially for the bonding of substrates having different coefficients of thermal expansion, especially in the shell construction of modes of transport or white goods.

PRIOR ART

Thermosetting epoxy resin compositions have long been known. An important field of use of thermosetting epoxy resin compositions is in motor vehicle construction, especially in bonding in the shell construction of modes of transport or white goods. In both cases, after the application of the epoxy resin composition, the bonded article is heated in an oven, which also cures the thermosetting epoxy resin composition.

If two substrates having different coefficients of linear thermal expansion are bonded to one another by structural bonding, the result of the curing step in the oven at temperatures of 120-220° C. is that the two substrates expand to different lengths. The subsequent cooling thus gives rise to a high tension in the cured epoxy resin composition, which leads either to failure of the adhesive bond, to deformation of the substrates, or to "freezing" of the tension in the adhesive bond. As a result of such "freezing", the adhesive bond during its lifetime is significantly more sensitive to static, dynamic and shock stresses, which can lead to weakening of the adhesive bond.

There is therefore a need for thermosetting epoxy resin compositions for structural bonding of substrates having different coefficients of thermal linear expansion, which firstly have adequate mechanical properties for structural bonding and secondly withstand the high stresses that occur in thermosetting without failure of the structural bond.

SUMMARY OF THE INVENTION

The object of the present invention is therefore that of providing thermosetting epoxy resin compositions suitable for structural bonding of substrates having different coefficients of linear thermal expansion, which firstly have adequate mechanical properties for structural bonding and secondly assure bonding in spite of the high stresses that occur in thermosetting without failure of the structural bond.

This object was surprisingly achieved by an inventive use as claimed in claim 1.

Further aspects of the invention are the subject of further independent claims. Particularly preferred embodiments of the invention are the subject of the dependent claims.

BRIEF DESCRIPTION OF THE DRAWINGS

FIGS. 2 to 4 show the maximum linear expansion as a function of the proportion of the used impact modifier.

WAYS OF EXECUTING THE INVENTION

Figure 1:
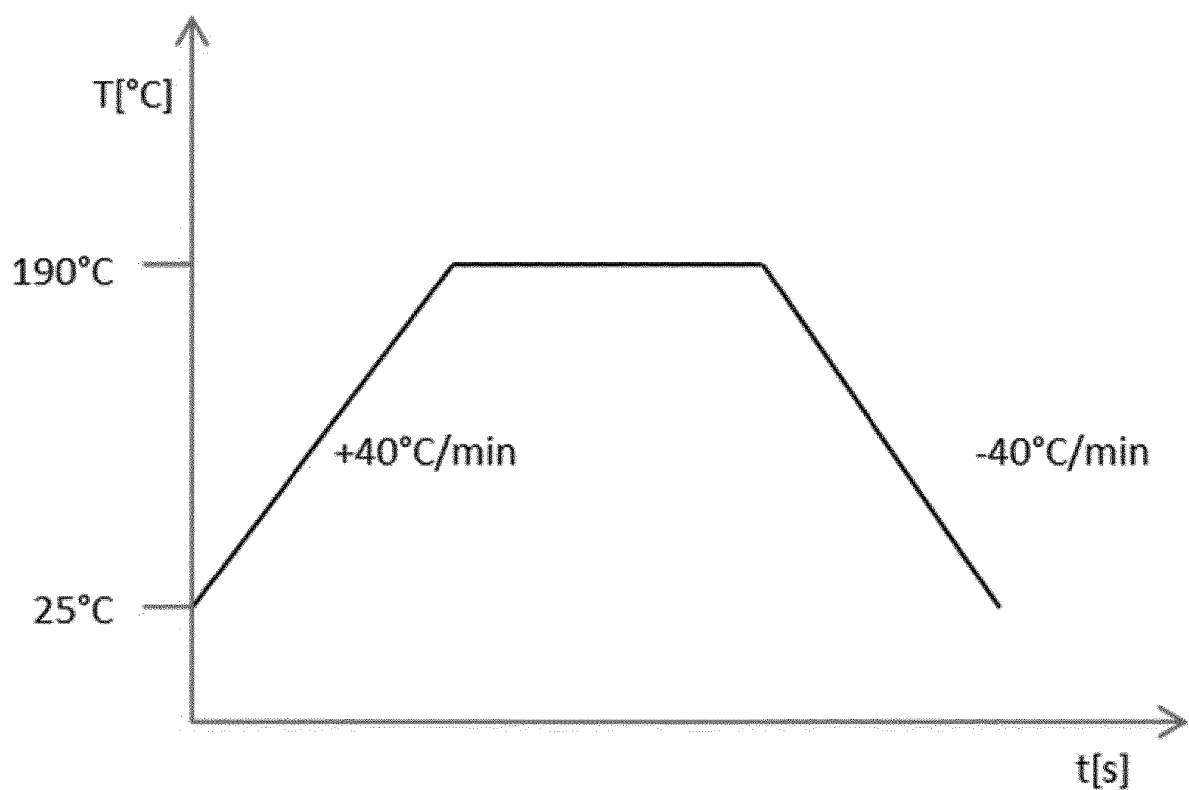
FIG. 1 shows a temperature profile for heating and cooling of samples for the simulation of "Δα-induced" tension scenarios.

The present invention relates to the use of at least one toughness improver D for increasing the maximum linear expansion Max. elongation of a one-component thermosetting epoxy resin composition, wherein the one-component thermosetting epoxy resin composition comprises:

a) at least one epoxy resin A having an average of more than one epoxy group per molecule;
b) at least one latent curing agent for epoxy resins B;
where the weight ratio of the at least one epoxy resin A having an average of more than one epoxy group per molecule to the at least one toughness improver D is 0.3-2.2,
and wherein the toughness improver D is a terminally blocked polyurethane prepolymer of the formula (I):

where $R^1$ is a p-valent radical of a linear or branched polyurethane prepolymer terminated by isocyanate groups after the removal of the terminal isocyanate groups;
p has a value of 2 to 8; and
$R^2$ is a blocking group which is detached at a temperature above 100° C., where $R^2$ is not a substituent selected from the group consisting of

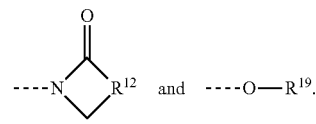

$R^{12}$ is an alkylene group which has 2 to 5 carbon atoms and optionally has double bonds or is substituted, or is a phenylene group or a hydrogenated phenylene group, especially ε-caprolactam after removal of the NH proton.
$R^{19}$ represents bisphenols, after removal of a hydroxyl group, especially bisphenol A, bisphenol F and 2,2'-diallylbisphenol A.
The maximum linear expansion Max. elongation is determined in a lap shear test during the cooling of a heated cured lap shear specimen.

In this document, the use of the term "independently" in connection with substituents, radicals or groups should be interpreted such that the substituents, radicals or groups having the same designation in the same molecule may occur simultaneously with different meanings.

In this document, a "toughness improver" is understood to mean an addition to an epoxy resin matrix that results in a distinct increase in toughness even in the case of small additions of 5% by weight, especially 10% by weight, based on the total weight of the epoxy resin compositions and is thus capable of absorbing higher flexural, tensile, impact or shock stress before the matrix cracks or breaks.

The prefix "poly" in substance names such as "polyol", "polyisocyanate", "polyether" or "polyamine" in the present document indicates that the respective substance formally contains more than one of the functional group that occurs in its name per molecule.

In the present document, "molecular weight" is understood to mean the molar mass (in grams per mole) of a molecule. "Average molecular weight" is understood to mean the number-average molecular weight $M_n$ of an oligomeric or polymeric mixture of molecules, which is typically determined by means of GPC against polystyrene as standard.

A "primary hydroxyl group" refers to an OH group bonded to a carbon atom having two hydrogens.

In the present document, the term "primary amino group" refers to an $NH_2$ group bonded to one organic radical, while the term "secondary amino group" refers to an NH group bonded to two organic radicals which may also together be part of a ring. Accordingly, an amine having one primary amino group is referred to as "primary amine", one having a secondary amino group correspondingly as "secondary amine", and one having a tertiary amino group as "tertiary amine".

In the present document, "room temperature" refers to a temperature of 23° C.

Description of Test Method for Maximum Linear Elongation (Max. Elongation) and Maximum Force If two substrates, for example metals or fiber-reinforced plastics, having different coefficients of linear thermal expansion ($\Delta\alpha$) are bonded to one another by structural bonding, especially in bodyshell construction, the result of the curing step in the oven at temperatures of 120-220° C., for example while passing through a convection oven, is that the two substrates expand to different lengths. The subsequent cooling, for example while passing through cooling zones, thus gives rise to a high tension in the cured epoxy resin composition, which leads either to failure of the adhesive bond, to deformation of the substrates, or to "freezing" of the tension in the adhesive bond.

In order to be able to better examine the characteristics of cured epoxy resin compositions, a laboratory method for assessment of their tolerance to "$\Delta\alpha$-induced" tensions was developed.

Rather than inducing a tension by means of a linear thermal expansion, which would require test specimens having similar dimensions to real bodywork components, the "$\Delta\alpha$ tension" in the laboratory method was applied to a lap shear specimen via a tensile tester. The temperature profile in the convection oven was simulated by two thermocouples that enable temperature control of the lap shear specimen in the region of the bonding surface with defined heating and cooling rates. Since the cooling phase is the most critical, a tension was applied via the tensile tester only during the cooling in this test. According to the strain rate setting on the tensile tester, it is thus possible to simulate variable tension scenarios that would arise with different substrate combinations.

Test Specimens Used and Preparation Thereof

For the simulation of "$\Delta\alpha$-induced" tensions, lap shear specimens that were produced from galvanized steel sheet (thickness 1.5 mm, yield point 420 MPa) as follows were used:

Preparation:

1.) Clean steel sheet (25 mm×100 mm×1.5 mm) with heptane and then oil in a defined manner with 3 g/m² of Anticorit PL3802-39S (deep drawing oil, FUCHS Schmierstoffe GmbH).

2.) Bound bonding area (10 mm×25 mm) with Teflon spacers (thickness 1.5 mm) and apply epoxy resin composition.

3.) Join sheets and laterally fix bonding area with one clamp on each side.

4.) Heat the lap shear specimens at 180° C. for 35 min (dwell time) to cure the epoxy resin composition.

5.) After cooling the samples the Teflon spacer is removed.

Determination of Parameters

As already mentioned, it is possible by this test method to simulate various $\Delta\alpha$-induced tension scenarios via the setting of the strain rate to which the lap shear specimen is subjected. Using the example of a material combination consisting of aluminum on steel ($\Delta\alpha=13*10^{-6}$ $K^{-1}$), the necessary strain rate is to be calculated below, taking account of equations (1) and (2).

Thermal expansion of solid bodies in a linear approximation $$\Delta L = L_0 * \alpha * \Delta T \qquad \text{Equation (1)}$$

$$\Delta T = T_2 - T_1 \qquad \text{Equation (2)}$$

The starting length $L_0$ of the two joining partners is to be 1000 mm. In accordance with standard temperature progressions in convection ovens, the temperature profile shown in FIG. 1 was defined for heating and cooling of the samples. This results in starting temperature and final temperature $T_1/T_2$ and the temperature differential $\Delta T$. Heating and cooling rates were likewise chosen as values typical in the automotive industry of 40° C./min.

$L_0 = 1000$ mm
$\alpha_{Stahl} = 10.8*10^{-6}$ $[K^{-1}]$
$\alpha_{Alu} = 23.8*10^{-6}$ $[K^{-1}]$
$\Delta T = 165$ [K]
$T_2 = 190 [° C.]$
$T_1 = 25 [° C.]$ $$\Delta L_{Stahl} = 1000\text{ mm}*10.8*10^{-6}\text{ }K^{-1}*165K = 1.782\text{ mm} \qquad \text{Equation (4)}$$

$$\Delta L_{Alu} = 1000\text{ mm}*23.8*10^{-6}\text{ }K^{-1}*165K = 3.927\text{ mm} \qquad \text{Equation (5)}$$

The coefficients of thermal expansion for steel $\alpha_{Stahl}$ and aluminum $\alpha_{Alu}$ were taken from the literature. If the defined values are inserted into equations 1 and 2, the thermal expansion $\Delta L$ for steel and aluminum is obtained according to equations 4 and 5. During the heating phase, this results in a linear expansion differential of 2.145 mm by which aluminum expands more significantly than steel. Correspondingly, the cured epoxy resin composition that forms a cohesive bond must compensate for a shrinkage differential of likewise 2.145 mm during the cooling phase. Taking account of the cooling rate $V_A$ of 40° C./min, according to equations 6 and 7, a strain rate $V_{Zug}$ of 0.52 mm/min is thus found.

$$V_{Zug} = (\Delta L_{Alu} - \Delta L_{Stahl}) * \frac{V_A}{(T_2 - T_1)} \qquad \text{Equation (6)}$$

$$V_{Zug} = (3.927\text{ mm} - 1.782\text{ mm}) * \frac{40\frac{° C.}{min}}{(190° C. - 25° C.)} = 0.52\text{ mm/min} \qquad \text{Equation (7)}$$

Performance of a Measurement:

1.) A lap shear specimen prepared according to the above-described preparation instructions is clamped in a tensile tester. At first, however, only the lower clamp jaw is fixed. The clamped length is 100 mm.

2.) Both thermocouples are pressed onto the sample, such that they are in contact with the bonding surface.

3.) Starting temperature and final temperature are set to 25° C. and 190° C. at the control unit. The input for heating and cooling rates is 40° C./min.

4.) The heating phase is started.

5.) On attainment of the final temperature of 190° C., this is maintained by means of a countdown for 2 min in order to assure uniform heating of the bonding surface.

6.) 30 seconds before the countdown has elapsed, the lap shear specimen is then also fixed by the upper clamp jaw.

7.) When the countdown has elapsed, the cooling phase is started automatically. At the same time, a lap shear test with a strain rate of 0.52 mm/min is started manually by means of the tensile tester control software.

Measurement Results and Evaluation

The measurement result measured is the force needed to deform the lap shear specimen until it fractures while it is being cooled down from 190° C. to 25° C. A triple determination is conducted for each epoxy resin composition. The linear expansion Max. elongation is determined from the distance traversed. The measurement was evaluated by taking, from the measurement protocol, the averages of the maximum linear expansion Max. elongation ($\varepsilon_M 2$) at maximum force ($\sigma_M^2$).

The higher the maximum linear expansion Max. elongation achieved, the more "Δα-tolerant" the epoxy resin composition can be considered. It is further advantageous for a "Δα-tolerant" epoxy resin composition when a small maximum force has to be expended. More preferably, such an epoxy resin composition has a high maximum linear expansion Max. elongation and a low maximum force to be expended.

A further point of interest is the juncture of failure. If this happens before the end of the cooling phase, i.e. a fracture occurs at a strain rate $L_0$=1000 mm und $\Delta\alpha$=13*10$^{-6}$ K$^{-1}$ of 0.52 mm/min prior to attainment of a linear expansion of 2.145 mm, the "Δα tolerance" of the epoxy resin composition is regarded as disadvantageous since such an epoxy resin composition would lead to component failure in a real application with ($L_0$=1000 mm und $\Delta\alpha$=13*10$^{-6}$ K$^{-1}$). By contrast, if the fracture occurs at elongations of ≥2.145 mm, this is considered to be preferred "Δα tolerance". The higher the linear expansion, the better the "Δα tolerance".

A further parameter of interest is the level of force at the end of the cooling phase, i.e. on attainment of a linear expansion of 2.145 mm. The higher the level of force, the more frozen tensions are to be expected in the epoxy resin composition and irreversible deformations in the substrates. Correspondingly, as low as possible a level of force is an advantageous result here.

The maximum linear expansion Max. elongation is determined in a lap shear test during the cooling of a heated cured lap shear specimen.

The maximum linear expansion Max. elongation is preferably measured in a lap shear test at a strain rate $V_{st}$ of 0.52 mm/min.

Preferably, the maximum linear expansion Max. elongation is determined as the linear expansion at the maximum force measured in the lap shear test.

Preferably, the maximum linear expansion Max. elongation in the lap shear test is determined from the distance traversed.

Preferably, the temperature of the lap shear specimen in the lap shear test is 190° C. at the start of the measurement and the lap shear specimen is cooled at the start of the measurement at a cooling rate of 40° C./min to a temperature of 25° C. and then left at that temperature. Preferably, the lap shear specimen is heated before the start of the measurement at a heating rate of 40° C./min to a temperature of 190° C.

Preferably, the lap shear test is a lap shear test for determining lap shear strength to DIN EN 1465.

Preferably, the lap shear test is a lap shear test having lap shear test specimens having the following features:
  steel sheets having the dimensions of 25 mm×100 mm×1.5 mm,
  bonding area of the cured one-component thermosetting epoxy resin composition having the dimensions of 10 mm×25 mm with a thickness of 1.5 mm, preferably 1.0 mm.

The steel sheets used are preferably made of hot dip galvanized steel.

Preferably, these further have a yield point of at least 420 MPa in order to minimize the influence of substrate deformation.

The maximum linear expansion Max. elongation is preferably determined from the distance traversed.

Preferably, the steel sheets are cleaned with heptane before the applying of the one-component thermosetting epoxy resin composition and then oiled in a defined manner with 3 g/m$^2$ of a deep drawing oil, especially Anticorit PL3802-39S.

Preferably, the one-component thermosetting epoxy resin composition cured at 180° C. for 35 min.

Preferably, the maximum linear expansion Max. elongation is ≥2.145 mm, preferably ≥2.2 mm, preferably ≥2.5 mm, preferably ≥2.8 mm, preferably ≥3.0 mm, preferably ≥3.5 mm, preferably ≥4.0 mm.

Preferably, the maximum force measured is ≤6000 N, preferably ≤5000 N, preferably ≤4500 N, preferably ≤4000 N, preferably ≤3500 N, preferably ≤3000 N, preferably ≤2500 N, preferably ≤2000 N.

Preferably, the force measured on attainment of the maximum linear expansion Max. elongation of 2.145 mm is ≤4000 N, preferably ≤3000 N, preferably ≤2500 N, preferably ≤2000 N, preferably ≤1500 N, preferably ≤1000 N, preferably ≤800 N, preferably ≤700 N.

The epoxy resin A having an average of more than one epoxy group per molecule is preferably a liquid epoxy resin or a solid epoxy resin. The term "solid epoxy resin" is very well known to a person skilled in the art of epoxies and is used in contrast to "liquid epoxy resins". The glass transition temperature of solid resins is above room temperature, meaning that they can be comminuted at room temperature to give free-flowing powders.

Preferred epoxy resins have the formula (II)

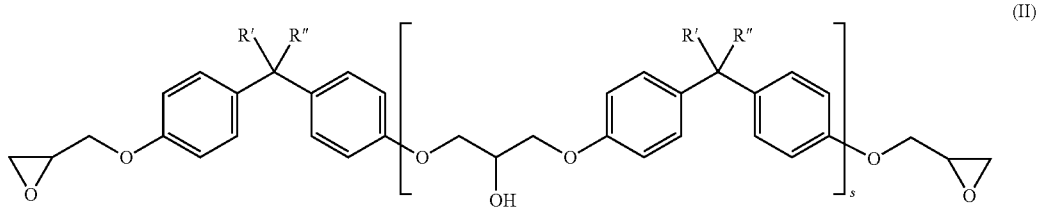

The substituents R' and R" here are independently either H or CH$_3$.

In solid epoxy resins, the index s has a value of >1.5, especially of 2 to 12.

Such solid epoxy resins are commercially available, for example from Dow or Huntsman or Hexion.

Compounds of the formula (II) having an index s of 1 to 1.5 are referred to as semisolid epoxy resins by the person skilled in the art. For the present invention here, they are likewise considered to be solid resins. However, preferred solid epoxy resins are epoxy resins in the narrower sense, i.e. where the index s has a value of >1.5.

In liquid epoxy resins, the index s has a value of less than 1. Preferably, s has a value of less than 0.2.

Preference is thus given to diglycidyl ethers of bisphenol A (DGEBA), of bisphenol F, and of bisphenol A/F. Such liquid resins are available, for example, as Araldite® GY 250, Araldite® PY 304, Araldite® GY 282 (Huntsman) or D.E.R.™ 331 or D.E.R.™ 330 (Dow) or Epikote 828 (Hexion).

Further suitable epoxy resins A are what are called epoxy novolaks. These especially have the following formula:

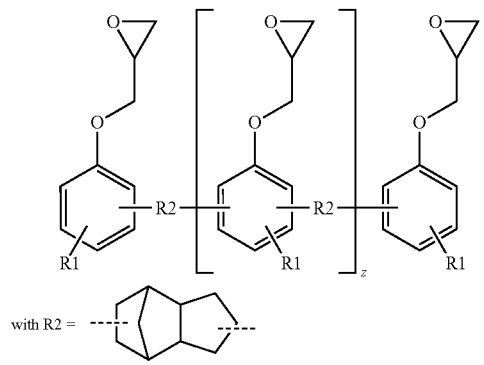

or CH$_2$, R1=H or methyl and z=0 to 7.

More particularly, these are phenol or cresol epoxy novolaks (R2=CH$_2$).

Such epoxy resins are commercially available under the EPN or ECN and Tactix® trade names from Huntsman or from the D.E.N.™ product series from Dow Chemical.

Preferably, the epoxy resin A is a liquid epoxy resin of the formula (II).

In a particularly preferred embodiment, the thermosetting epoxy resin composition contains both at least one liquid epoxy resin of the formula (II) with s<1, especially less than 0.2, and at least one solid epoxy resin of the formula (II) with s>1.5, especially from 2 to 12.

The proportion of the epoxy resin A is preferably 10-60% by weight, especially 30-50% by weight, based on the total weight of the epoxy resin composition.

It is further advantageous when 60-100% by weight, especially 60-80% by weight, of the epoxy resin A is an aforementioned liquid epoxy resin.

It is further advantageous when 0-40% by weight, especially 20-40% by weight, of the epoxy resin A is an aforementioned solid epoxy resin.

The thermosetting epoxy resin composition contains at least one latent curing agent B for epoxy resins. This is activated by elevated temperature, preferably at temperatures of 70° C. or more.

Preferably, a curing agent is concerned here which is chosen from the group consisting of dicyandiamide; guanidines; anhydrides of polybasic carboxylic acids; dihydrazides and aminoguanidines.

More preferably, the curing agent B is dicyandiamide.

The amount of the latent curing agent B for epoxy resins is advantageously 0.1-30% by weight, especially 0.2-10% by weight, preferably 1-10% by weight, especially preferably 5-10% by weight, based on the weight of the epoxy resin A.

Preferably, the thermosetting epoxy resin composition additionally contains at least one accelerator C for epoxy resins. Such accelerating curing agents are preferably substituted ureas, for example 3-(3-chloro-4-methylphenyl)-1,1-dimethylurea (chlortoluron), or phenyldimethylureas, in particular p-chlorophenyl-N,N-dimethylurea (monuron), 3-phenyl-1,1-dimethylurea (fenuron) or 3,4-dichlorophenyl-N,N-dimethylurea (diuron). In addition, it is possible to use compounds from the class of the imidazoles, such as 2-isopropylimidazole or 2-hydroxy-N-(2-(2-(2-hydroxyphenyl)-4,5-dihydroimidazol-1-yl)ethyl)benzamide, imidazolines and amine complexes.

Preferably, the accelerator C for epoxy resins is selected from the list consisting of substituted ureas, imidazoles, imidazolines and amine complexes.

More preferably, the accelerator C for epoxy resins is selected from the list consisting of substituted ureas and amine complexes, especially when the latent curing agent B is a guanidine, especially dicyandiamide.

The one-component thermosetting epoxy resin composition comprises at least one toughness improver D. The toughness improvers D may be liquid or solid.

The toughness improver D is a terminally blocked polyurethane polymer of the formula (I).

R$^1$ here is a p-valent radical of a linear or branched polyurethane prepolymer terminated by isocyanate groups after the removal of the terminal isocyanate groups, and p has a value of 2 to 8.

Further, R$^2$ is a blocking group which is detached at a temperature above 100° C., where R$^2$ is not a substituent selected from the group consisting of

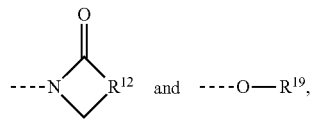

where

R$^{12}$ is an alkylene group which has 2 to 5 carbon atoms and optionally has double bonds or is substituted, or is a phenylene group or a hydrogenated phenylene group, especially ε-caprolactam after removal of the NH proton; and R$^{19}$ represents bisphenols, after removal of a hydroxyl group, especially bisphenol A, bisphenol F and 2,2'-diallylbisphenol A, more preferably bisphenol A and bisphenol F.

The term "bisphenols" in this connection is preferably understood to mean compounds that have two phenyl rings joined via a carbon atom as their common structural feature.

It has been found that, surprisingly, by virtue of the aforementioned substituents

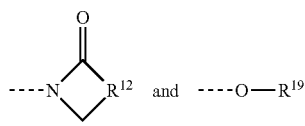

inadequate values are obtained for the maximum linear expansion Max. elongation. This is apparent, for example, in the comparison of examples 8 and 9 in table 4 with the examples in table 3.

Preferably, $R^2$ is independently a substituent selected from the group consisting of

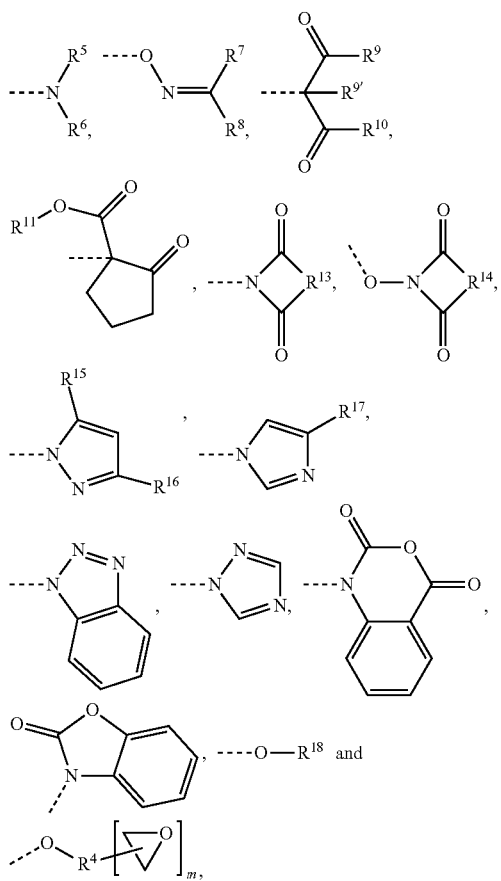

where $R^5$, $R^6$, $R^7$ and $R^8$ are each independently an alkyl or cycloalkyl or aralkyl or arylalkyl group or $R^5$ together with $R^6$, or $R^7$ together with $R^8$, form part of a 4- to 7-membered, optionally substituted ring;

$R^9$, $R^{9'}$ and $R^{10}$ are each independently an alkyl or aralkyl or arylalkyl group or an alkyloxy or aryloxy or aralkyloxy group;

$R^{11}$ is an alkyl group, $R^{13}$ and $R^{14}$ are each independently an alkylene group which has 2 to 5 carbon atoms and optionally has double bonds or is substituted, or a phenylene group or a hydrogenated phenylene group;

$R^{15}$, $R^{16}$ and $R^{17}$ are each independently H or an alkyl group or an aryl group or an aralkyl group; and $R^{18}$ is an aralkyl group having a substituted or unsubstituted aromatic group or is a monocyclic substituted or unsubstituted aromatic group optionally having aromatic hydroxyl groups;

$R^4$ is a radical of an aliphatic, cycloaliphatic, aromatic or araliphatic epoxide containing a primary or secondary hydroxyl group after the removal of the hydroxyl and epoxy groups;

and m has a value of 1, 2 or 3.

More preferably, $R^2$ is independently a substituent selected from the group consisting of

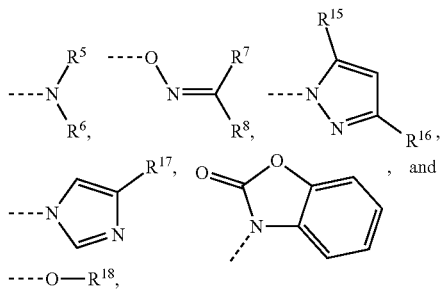

especially

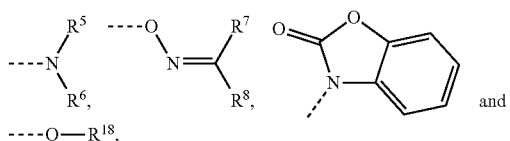

preferably

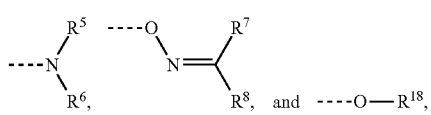

more preferably

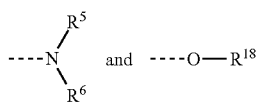

most preferably

—O—$R^{18}$.

It has been found that, surprisingly, higher values for modulus of elasticity, tensile strength, elongation at break, lap shear strength, T-peel strength and impact peel strength are obtained as a result. This is apparent, for example, in table 3 by the comparison of examples 1-7.

$R^{18}$ is considered to be especially phenols after removal of a hydroxyl group. Preferred examples of such phenols are especially selected from the list consisting of phenol, cresol, 4-methoxyphenol (HQMME), resorcinol, catechol, cardanol (3-pentadecenylphenol (from cashewnutshell oil)) and nonylphenol.

$R^{18}$ is secondly considered to be especially hydroxybenzyl alcohol and benzyl alcohol after removal of a hydroxyl group.

Preferred substituents of the formula —O—$R^{18}$ are monophenols after removal of a phenolic hydrogen atom. Particularly preferred examples of such $R^2$ radicals are radicals selected from the group consisting of

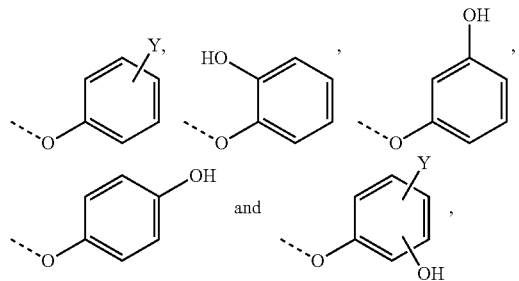

preferably

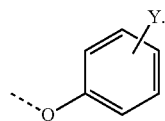

The Y radical here is a saturated, aromatic or olefinically unsaturated hydrocarbyl radical having 1 to 20 carbon atoms, especially having 1 to 15 carbon atoms. Preferred Y are especially allyl, methyl, nonyl, dodecyl, phenyl, alkyl ether, especially methyl ether, carboxylic ester or an unsaturated $C_{15}$-alkyl radical having 1 to 3 double bonds. Most preferably, Y is selected from the group consisting of alkyl ether, especially methyl ether, and unsaturated $C_{15}$-alkyl radical having 1 to 3 double bonds.

More preferably, $R^{18}$ comprises phenols after removal of one hydroxyl group; particularly preferred examples of such phenols are selected from the list consisting of 4-methoxyphenol (HQMME) and cardanol (3-pentadecenylphenol (from cashewnutshell oil)).

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, it is especially a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$ or $R^{17}$ is an aralkyl group, this moiety is especially a methylene-bonded aromatic group, especially a benzyl group.

If $R^5$, $R^6$, $R^7$, $R^8$, $R^9$, $R^{9'}$ or $R^{10}$ is an alkylaryl group, this is especially a phenylene-bonded $C_1$- to $C_{20}$-alkyl group, for example tolyl or xylyl.

The terminally blocked polyurethane prepolymer of the formula (I) is prepared from the linear or branched polyurethane prepolymer terminated by isocyanate groups with one or more isocyanate-reactive compounds $R^2H$. If two or more such isocyanate-reactive compounds are used, the reaction can be effected sequentially or with a mixture of these compounds.

The polyurethane prepolymer with isocyanate end groups on which $R^1$ is based can be prepared from at least one diisocyanate or triisocyanate and from a polymer $Q_{PM}$ having terminal amino, thiol or hydroxyl groups.

Suitable diisocyanates are aliphatic, cycloaliphatic, aromatic or araliphatic diisocyanates, especially commercial products such as methylene diphenyl diisocyanate (MDI), hexamethylene diisocyanate (HDI), toluene diisocyanate (TDI), toluidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate ($H_{12}$MDI), p-phenylene diisocyanate (PPDI), m-tetramethylxylylene diisocyanate (TMXDI), etc. and dimers thereof. Preference is given to HDI, IPDI, MDI or TDI.

Suitable triisocyanates are trimers or biurets of aliphatic, cycloaliphatic, aromatic or araliphatic diisocyanates, especially the isocyanurates and biurets of the diisocyanates described in the previous paragraph. It is of course also possible to use suitable mixtures of di- or triisocyanates.

Especially suitable polymers $Q_{PM}$ having terminal amino, thiol or hydroxyl groups are polymers $Q_{PM}$ having two or three terminal amino, thiol or hydroxyl groups.

The polymers $Q_{PM}$ advantageously have an equivalent weight of 300-6000, especially of 600-4000, preferably of 700-2200, g/equivalent of NCO-reactive groups.

Preferred polymers $Q_{PM}$ are polyols having average molecular weights between 600 and 6000 daltons, selected from the group consisting of polyethylene glycols, polypropylene glycols, polyethylene glycol-polypropylene glycol block polymers, polybutylene glycols, polytetramethylene ether glycols, hydroxyl-terminated polybutadienes, hydroxyl-terminated butadiene-acrylonitrile copolymers and mixtures thereof; polytetramethylene ether glycols and hydroxyl-terminated polybutadienes are especially preferred.

It is possible to use one or more polytetramethylene ether glycols. Polytetramethylene ether glycol is also referred to as polytetrahydrofuran or PTMEG. PTMEG can be prepared, for example, by polymerization of tetrahydrofuran, for example via acidic catalysis. The polytetramethylene ether glycols are especially diols.

Polytetramethylene ether glycols are commercially available, for example the PolyTHF® products from BASF such as PolyTHF®2000, PolyTHF®2500 CO or PolyTHF®3000 CO, the Terathane® products from Invista B.V or the Polymeg® products from LyondellBasell.

The OH functionality of the polytetramethylene ether glycol used is preferably in the region of about 2, for example in the range from 1.9 to 2.1. This results from the cationic polymerization of the starting tetrahydrofuran monomer.

Advantageous polytetramethylene ether glycols are those having OH numbers between 170 mg/KOH g and 35 mg KOH/g, preferably in the range from 100 mg KOH/g to 40 mg KOH/g, and most preferably 70 to 50 mg KOH/g. Unless stated otherwise, in the present application, the OH number is determined by titrimetry to DIN 53240. The hydroxyl number is determined here by acetylation with acetic anhydride and subsequent titration of the excess acetic anhydride with alcoholic potassium hydroxide solution.

With knowledge of difunctionality, it is possible to use the hydroxyl numbers ascertained by titrimetry to determine the OH equivalent weights or the average molecular weight of the polytetramethylene ether glycol used.

Polytetramethylene ether glycols used advantageously in the present invention preferably have an average molecular weight in the range from 600 to 5000 g/mol, more preferably 1000 to 3000 g/mol and especially preferably in the range from 1500 to 2500 g/mol, especially about 2000 g/mol.

It is possible to use one or more hydroxyl-terminated polybutadiene(s). It is also possible to use mixtures of two or more hydroxyl-terminated polybutadienes.

Suitable hydroxyl-terminated polybutadienes are especially those that are prepared by free-radical polymerization of 1,3-butadiene, using, for example, an azo nitrile or hydrogen peroxide as initiator. Hydroxyl-terminated polybutadienes are commercially available, for example the Poly bd® products from Cray Valley such as Poly bd® R45V, Polyvest®HT from Evonik, and Hypro®2800X95HTB from Emerald Performance Materials LLC.

The hydroxyl-terminated polybutadiene preferably has an average molecular weight of less than 5000, preferably in the range from 2000 to 4000, g/mol. The OH functionality of the hydroxyl-terminated polybutadiene is preferably in the range from 1.7 to 2.8, preferably from 2.4 to 2.8.

Further preferred are hydroxyl-terminated polybutadienes having an acrylonitrile content of less than 15%, preferably less than 5%, especially preferably less than 1%, especially preferably of less than 0.1%. Most preferred are hydroxyl-terminated polybutadienes free of acrylonitrile.

Based on the total weight of the polyols used for preparation of the isocyanate-terminated polymer, the total proportion of polytetramethylene ether glycol and hydroxyl-terminated polybutadiene is preferably at least 95% by weight and more preferably at least 98% by weight. In a preferred embodiment, solely polytetramethylene ether glycol and/or hydroxyl-terminated polybutadiene are used as polyols.

The weight ratio of polytetramethylene ether glycol to hydroxyl-terminated polybutadiene is preferably in the range from 100/0 to 70/30, more preferably from 100/0 to 60/40, more preferably from 100/0 to 90/10 and most preferably 100/0.

This is advantageous in that higher values for modulus of elasticity, tensile strength, elongation at break, lap shear strength, T-peel strength and impact peel strength are obtained as a result. This is apparent, for example, in the comparison of examples 2 and 3 in table 3.

In a preferred embodiment, the polyurethane prepolymer is prepared from at least one diisocyanate or triisocyanate and from a polymer $Q_{PM}$ having terminal amino, thiol or hydroxyl groups. The polyurethane prepolymer is prepared in a manner known to the person skilled in the art of polyurethane, especially by using the diisocyanate or triisocyanate in a stoichiometric excess in relation to the amino, thiol or hydroxyl groups of the polymer $Q_{PM}$.

The polyurethane prepolymer having isocyanate end groups preferably has elastic character. It preferably exhibits a glass transition temperature Tg of less than 0° C.

The weight ratio of the at least one epoxy resin A having an average of more than one epoxy group per molecule to the at least one toughness improver D is 0.3-2.2.

A weight ratio of less than 0.3 is disadvantageous in that the compositions cure very slowly, if at all, as a result. Further, low values in particular are obtained in modulus of elasticity, tensile strength and T-peel strength.

A weight ratio of more than 2.2 is disadvantageous in that compositions having low values of T-peel strength and maximum linear elongation are obtained as a result.

This is apparent, for example, in table 6.

Preferably, the weight ratio of the at least one epoxy resin A having an average of more than one epoxy group per molecule to the at least one toughness improver D is 0.4-2.0, more preferably 0.5-1.8, most preferably 0.6-1.4. This is advantageous in that the compositions have high values for T-peel strength and impact peel strength as a result.

It may further be advantageous when the weight ratio is 0.3-2.2, especially 0.4-2.2, 0.6-2.2, 1.0-2.2, 1.4-2.2, preferably 1.8-2.2. This is advantageous in that the compositions have high values for modulus of elasticity and tensile strength as a result.

If the weight ratio is 0.4-2.0, especially 0.4-1.8, preferably 0.4-1.4, more preferably 0.4-1.0, this is advantageous in that the compositions have high values for impact peel strength at −30° C. as a result when $R^2$ is selected from the group consisting of

and

most preferably

It may further be advantageous when the weight ratio is 0.3-2.0, especially 0.3-1.8, 0.3-1.4, 0.3-1.0, 0.3-0.6, preferably 0.3-0.4. This gives compositions having high values for maximum linear expansion Max. elongation and maximum force.

In a further preferred embodiment, the composition additionally comprises at least one filler F. Preference is given here to mica, talc, kaolin, wollastonite, feldspar, syenite, chlorite, bentonite, montmorillonite, calcium carbonate (precipitated or ground), dolomite, quartz, silicas (fused or precipitated), cristobalite, calcium oxide, aluminum hydroxide, magnesium oxide, hollow ceramic beads, hollow glass beads, hollow organic beads, glass beads, color pigments.

Advantageously, the total proportion of the overall filler F is 5-40% by weight, preferably 10-30% by weight, based on the total weight of the epoxy resin composition.

In a further embodiment, the composition may comprise a physical or chemical blowing agent as obtainable, for example, under the Expancel™ trade name from Akzo Nobel or Celogen™ from Chemtura or under the Luvopor® trade name from Lehmann & Voss. The proportion of the blowing agent is typically 0.1-3% by weight, based on the total weight of the epoxy resin composition. The composition preferably includes less than 1% by weight, preferably less than 0.5% by weight, more preferably less than 0.3% by weight, most preferably less than 0.1% by weight, of physical or chemical blowing agent, based on the total weight of the epoxy resin composition.

In a further preferred embodiment, the composition additionally comprises at least one epoxy-bearing reactive diluent G. Such reactive diluents are known to those skilled in the art. Preferred examples of epoxy-bearing reactive diluents are:

glycidyl ethers of monofunctional, saturated or unsaturated, branched or unbranched, cyclic or open-chain, $C_4$-$C_{30}$ alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether, and the like;

glycidyl ethers of difunctional, saturated or unsaturated, branched or unbranched, cyclic or open-chain, $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, and the like;

glycidyl ethers of tri- or polyfunctional, saturated or unsaturated, branched or unbranched, cyclic or open-chain, alcohols, such as epoxidized castor oil, epoxidized trimethylolpropane, epoxidized pentaerythritol or polyglycidyl ethers of aliphatic polyols, such as sorbitol, glycerol, trimethylolpropane, and the like;

glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashewnutshell oil), N,N-diglycidylaniline, and the like;

epoxidized amines, such as N,N-diglycidylcyclohexylamine, and the like;

epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids, and the like;

epoxidized di- or trifunctional, low to high molecular weight polyether polyols, such as polyethylene glycol diglycidyl ether, polypropylene glycol diglycidyl ether, and the like.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the epoxy-bearing reactive diluent G is 0.1-15% by weight, preferably 0.1-5% by weight, especially preferably 0.1-2% by weight, more preferably 0.2-1% by weight, based on the total weight of the epoxy resin composition.

The composition may include further constituents, especially catalysts, stabilizers, especially heat and/or light stabilizers, thixotropic agents, plasticizers, solvents, mineral or organic fillers, blowing agents, dyes and pigments, anticorrosives, surfactants, defoamers and adhesion promoters.

Suitable plasticizers are especially phenol alkylsulfonates or N-butylbenzamide, as commercially available as Mesamoll® or Dellatol BBS from Bayer.

Suitable stabilizers are especially optionally substituted phenols such as BHT or Wingstay® T (Elikem), sterically hindered amines or N-oxyl compounds such as TEMPO (Evonik).

A particularly preferred one-component epoxy resin composition comprises:

10-60% by weight, especially 20-40% by weight, based on the total weight of the epoxy resin composition, of epoxy resin A having an average of more than one epoxy group per molecule; preferably 60-100% by weight, especially 60-80% by weight, of the epoxy resin A is a liquid epoxy resin and 0-40% by weight, especially 20-40% by weight, of the epoxy resin A is a solid epoxy resin;

at least one latent curing agent for epoxy resins B, preferably selected from dicyandiamide, guanidines, anhydrides of polybasic carboxylic acids, dihydrazides, and aminoguanidines, and derivatives thereof, preference being given to dicyandiamide;

preferably at least one accelerator C selected from the list consisting of substituted ureas, imidazoles, imidazolines and amine complexes, especially selected from the list consisting of substituted ureas and amine complexes, especially preferably substituted ureas;

at least one aforementioned toughness improver D, preference being given to those that have been described above as preferred toughness improvers D; the amount of toughness improvers D is preferably 20-60% by weight, 25-55% by weight, 30-50% by weight, more preferably 30-40% by weight, based on the total weight of the epoxy resin composition;

preferably 5-40% by weight, preferably 10-30% by weight, based on the total weight of the epoxy resin composition, of a filler F, preferably selected from the group consisting of wollastonite, calcium carbonate, calcium oxide, color pigments, especially carbon black, and fumed silicas, especially calcium carbonate, calcium oxide and fumed silicas;

preferably 0.1-15% by weight, preferably 0.1-5% by weight, especially preferably 0.1-2% by weight, more preferably 0.2-1% by weight, based on the total weight of the epoxy resin composition, of an epoxy-bearing reactive diluent G;

where the weight ratio of the at least one epoxy resin A having an average of more than one epoxy group per molecule to the at least one toughness improver D is 0.3-2.2, 0.4-2.0, more preferably 1.0-1.8.

It may further be advantageous when the preferred one-component epoxy resin composition consists of the aforementioned constituents to an extent of more than 80% by weight, preferably more than 90% by weight, especially more than 95% by weight, especially preferably more than 98% by weight, most preferably more than 99% by weight, based on the total weight of the epoxy resin composition.

An example of a particularly preferred composition is, for example, example 13 in table 5.

It is advantageous when the epoxy resin composition of the invention has a viscosity at 25° C. of 100-10 000 Pa*s, especially 500-5000 Pa*s, preferably 1000-3000 Pa*s. This is advantageous in that this assures good applicability. Preferably, the viscosity is measured as described in the examples.

Particular preference is given to thermosetting epoxy resin compositions having, in the cured state:

a lap shear strength, especially measured to DIN EN 1465, more preferably as described in the examples, of more than 10 MPa, more than 15 MPa, more than 20 MPa, and/or a tensile strength, especially measured to DIN EN ISO 527, more preferably as described in the examples, of more than 10 MPa, more than 15 MPa, more than 20 MPa, and/or an elongation at break, especially measured to DIN EN ISO 527, more preferably as described in the examples, of more than 10%, more than 20%, more than 30%, especially 30-200%, more preferably 30-150%, and/or a modulus of elasticity, especially measured to DIN EN ISO 527, more preferably as described in the examples, of 300-1000 MPa, especially of 500-800 MPa, an impact peel strength, especially measured to ISO 11343, more preferably as described in the examples, of more than 30 N/mm, more than 40 N/mm, more than 60 N/mm, at 23° C., and/or a T-peel strength, especially measured to DIN 53281, more preferably as described in the examples, of more than 5 N/mm, more than 8 N/mm, more than 10 N/mm.

The invention comprises the use of at least one toughness improver D for increasing the maximum linear expansion Max. elongation of an aforementioned one-component thermosetting epoxy resin composition.

The increase in maximum linear expansion Max. elongation is based on the comparison with a one-component thermosetting epoxy resin composition that especially does not include:

the inventive weight ratio of the at least one epoxy resin A having an average of more than one epoxy group per molecule to the at least one toughness improver D and/or an inventive toughness improver D.

Preferably, in the case of the inventive use, the increase in the maximum linear expansion Max. elongation, compared to a one-component thermosetting epoxy resin composition that especially does not include:

the inventive weight ratio of the at least one epoxy resin A having an average of more than one epoxy group per molecule to the at least one toughness improver D and/or an inventive toughness improver D aufweist, is more than 20%, more than 30%, especially more than 40%, more than 50%, especially preferably more than 75%, more preferably more than 100%.

It has further been found that the thermosetting epoxy resin compositions described are particularly suitable for use as one-component thermosetting adhesives, especially as thermosetting one-component adhesive in motor vehicle construction and sandwich panel construction. Such a one-component adhesive has a range of possible uses. More particularly, thermosetting one-component adhesives that feature high impact resistance, both at higher temperatures and at low temperatures, are achievable thereby. Such adhesives are required for the adhesive bonding of heat-stable materials. Heat-stable materials are understood to mean materials that are dimensionally stable at least during the curing time at a curing temperature of 100-220° C., preferably 120-200° C. More particularly, these are metals and plastics such as ABS, polyamide, epoxy resin, polyester resin, polyphenylene ether, fiber-reinforced plastics such as glass fiber- and carbon fiber-reinforced plastics. Particularly preferred plastics are fiber-reinforced plastics. Preference is given to the use in which at least one material is a metal. A particularly preferred use is considered to be the bonding of different metals, especially metals having different linear thermal coefficients of expansion ($\Delta\alpha$) and/or the bonding of metals to fiber-reinforced plastics, especially in bodyshell construction in the automotive industry. The preferred metals are in particular steel, especially electrolytically galvanized, hot-dip-galvanized or oiled steel, Bonazinc-coated steel, and post-phosphated steel, and also aluminum, especially in the variants which typically occur in automobile construction.

Such an adhesive is especially contacted first with the materials to be bonded at a temperature of between 10° C. and 80° C., especially between 10° C. and 60° C., and later cured at a temperature of typically 130-220° C., preferably 140-200° C., more preferably 150-190° C.

Such an aforementioned use results in a bonded article. Such an article is preferably a motor vehicle or part of a motor vehicle.

A further aspect of the present invention accordingly relates to an adhesive-bonded article obtained from the abovementioned use. It is of course possible to use a composition of the invention to realize not only thermosetting adhesives but also sealing compounds. Furthermore, the compositions according to the invention are suitable not only for automobile construction but also for other fields of use. Particular mention should be made of related applications in the construction of transportation means, such as ships, trucks, buses or rail vehicles, or in the construction of consumer goods, such as, for example, washing machines.

The materials adhesive-bonded by means of an aforementioned composition are used at temperatures between typically 120° C. and −40° C., preferably between 100° C. and −40° C., in particular between 80° C. and −40° C.

EXAMPLES

Some examples which further illustrate the invention, but which are not intended to restrict the scope of the invention in any way, are cited below.

Determination of Isocyanate Content

The isocyanate content was determined in % by weight by means of a back-titration with di-n-butylamine used in excess and 0.1 M hydrochloric acid. All determinations were conducted in a semi-manual manner on a Mettler-Toledo DL50 Graphix titrator with automatic potentiometric endpoint determination. For this purpose, 600-800 mg in each case of the sample to be determined was dissolved while heating in a mixture of 10 ml of isopropanol and 40 ml of xylene, and then reacted with a solution of dibutylamine in xylene. Excess di-n-butylamine was titrated with 0.1 M hydrochloric acid, and the isocyanate content was calculated therefrom.

Maximum Linear Expansion (Max. Elongation) and Maximum Force (Max. Force)

Maximum linear expansion (Max. elongation) and maximum force (Max. force) were determined as described above under "Description of test method for maximum linear expansion (Max. elongation) and maximum force". A triple determination was conducted for each epoxy resin composition. The maximum linear expansion Max. elongation was determined from the distance traversed. The measurement was evaluated by taking, from the measurement protocol, the averages of the maximum linear expansion Max. elongation ($\varepsilon_{M}2$) at maximum force ($\sigma_{M}2$).

Tensile Strength, Elongation at Break and Modulus of Elasticity (DIN EN ISO 527)

An adhesive sample was pressed between two Teflon papers to a layer thickness of 2 mm. After curing at 175° C. for 35 min, the Teflon papers were removed and the specimens were die-cut to the DIN standard state. The test specimens were examined under standard climatic conditions at a strain rate of 2 mm/min. Tensile strength, elongation at break and the 0.05-0.25% modulus of elasticity were determined to DIN EN ISO 527.

Lap Shear Strength (LSS) (DIN EN 1465)

Cleaned test specimens of H420+Z steel (thickness 1.2 mm) that had been reoiled with Anticorit PL 3802-39S were bonded with the adhesive over a bonding area of 25×10 mm with glass beads as spacer in a layer thickness of 1.5 mm, and cured under the curing conditions specified.

Curing conditions: a) 35 min at oven temperature 175° C.

Lap shear strength was determined on a tensile tester at a strain rate of 10 mm/min in a triple determination to DIN EN 1465.

T-Peel Strength (DIN 53281)

130×25 mm test sheets of DC-04+ZE steel (thickness 0.8 mm) were prepared. Test sheets were processed at a height of 30 mm with a suitable die-cutting machine (90°). The cleaned 100×25 mm surfaces that had been reoiled with Anticorit PL 3802-39S were bonded with the adhesive with glass beads as spacer in a layer thickness of 0.3 mm, and cured for a dwell time of 35 min from attainment of an oven temperature of 175° C. T-peel strength was determined on a tensile tester at a strain rate of 100 mm/min in a duplicate determination as peel force in N/mm in the traversed distance range from 1/6 to 5/6 of the distance covered.

Impact Peel Strength (to ISO 11343)

The specimens were produced with the adhesive and DC04+ZE steel with dimensions of 90×20×0.8 mm. The bonding area here was 20×30 mm at a layer thickness of 0.3 mm with glass beads as spacer. Impact peel strength was measured in each case at the temperatures specified (RT=23° C., −30° C.) as a triple determination on a Zwick 450 impact pendulum at 2 m/s. The impact peel strength reported is the average force in N/mm under the measurement curve from 25% to 90% to ISO11343.

The adhesives were cured at oven temperature 175° C. for 35 min.

Viscosity

Viscosity measurements of the adhesives were effected 1 d after production on an Anton Paar MCR 101 rheometer by oscillation using a plate-plate geometry at a temperature of 25° C. or 50° C. with the following parameters: 5 Hz, 1 mm gap, plate-plate distance 25 mm, 1% deformation.

The following commercial products were used for the production of impact modifiers 1 to 9:

TABLE 1

| Compound | Description | Manufacturer |
|---|---|---|
| BHT (Ionol® CP) | Butylhydroxytoluene stabilizer | Evonik |
| PolyTHF® 2000 | Difunctional polytetramethylene ether glycol having a molar mass of 2000 g/mol | BASF |
| Poly bd® R45V | Hydroxyl-terminated polybutadiene having a molar mass of 2800 g/mol, OH functionality about 2.4-2.6 | Cray Valley |
| Vestanat IPDI | Isophorone diisocyanate | Evonik |
| Dibutyltin dilaurate | Catalyst | Thorson |
| 4-Methoxyphenol | Blocking agent | Solvay |
| Phenol | Blocking agent | Sigma-Aldrich |
| Caprolactam | Blocking agent | Sigma-Aldrich |
| Methyl ethyl ketoxime | Blocking agent | Sigma-Aldrich |
| 2-Benzoxazolinone | Blocking agent | Synthesia |
| 3,5-Dimethylpyrazole | Blocking agent | Chemtura |
| 2,2-Diallylbisphenol A | Blocking agent | Sigma-Aldrich |

Example 1: Impact Modifier SM1 (Phenol [1.2 Eq.] as Blocking Agent, PolyTHF2000/Poly BD R45HTLO Backbone)

225 g of PolyTHF 2000, 225 g of Poly bd R45V and 2.25 g of BHT as stabilizer were dewatered at 90° C. under reduced pressure with minimal stirring for 1 h. Subsequently, 90.83 g of isophorone diisocyanate (IPDI) and 0.059 g of dibutyltin dilaurate (DBTDL) were added. The reaction was conducted under moderate stirring at 90° C. under reduced pressure for 2 h in order to obtain an isocyanate-terminated polymer: Measured free NCO content: 3.05%.

To the resultant NCO-terminated polymer were added 0.117 g of dibutyltin dilaurate (DBTDL) and 44.35 g of phenol, and the isocyanate groups were depleted by reaction at 110° C. under reduced pressure for 5 h. Measured free NCO content: (directly after preparation) 0.53%, (1 day after preparation) 0.24%.

Example 2: Impact Modifier SM2 (4-Methoxyphenol [1.2 Eq.] as Blocking Agent, PolyTHF2000/PolyBD R45V as Backbone)

200 g of PolyTHF 2000, 200 g of Poly bd R45V and 2.00 g of BHT as stabilizer were dewatered at 90° C. under reduced pressure with minimal stirring for 1 h. Subsequently, 80.64 g of isophorone diisocyanate (IPDI) and 0.053 g of dibutyltin dilaurate (DBTDL) were added. The reaction was conducted under moderate stirring at 90° C. under reduced pressure for 2 h in order to obtain an isocyanate-terminated polymer: Measured free NCO content: 2.81%.

To the resultant NCO-terminated polymer were added 0.106 g of dibutyltin dilaurate (DBTDL) and 47.93 g of 4-methoxyphenol (HQMME), and the isocyanate groups were depleted by reaction at 110° C. under reduced pressure for 5 h. Measured free NCO content: (directly after preparation) 2.82%, (1 day after preparation) 0.09%.

Example 3: Impact Modifier SM3 (4-Methoxyphenol [1.2 Eq.] as Blocking Agent, PolyTHF 2000 as Backbone)

350 g of PolyTHF 2000 and 3.50 g of BHT as stabilizer were dewatered at 90° C. under reduced pressure with minimal stirring for 1 h. Subsequently, 77.82 g of isophorone diisocyanate (IPDI) and 0.048 g of dibutyltin dilaurate (DBTDL) were added. The reaction was conducted under moderate stirring at 90° C. under reduced pressure for 2 h in order to obtain an isocyanate-terminated polymer: Measured free NCO content: 3.35%.

To the resultant NCO-terminated polymer were added 0.096 g of dibutyltin dilaurate (DBTDL) and 50.76 g of 4-methoxyphenol (HQMME), and the isocyanate groups were depleted by reaction at 110° C. under reduced pressure for 5 h. Measured free NCO content: (directly after preparation) 0.48%, (1 day after preparation) 0.23%.

Viscosity (1 day after preparation): 422 Pa*s at 25° C., 82 Pa*s at 50° C.

Example 4: Impact Modifier SM4 (2-Benzoxazolinone [1.2 Eq.] as Blocking Agent, PolyTHF 2000 as Backbone)

400 g of PolyTHF 2000 and 4.50 g of BHT as stabilizer were dewatered at 90° C. under reduced pressure with minimal stirring for 1 h. Subsequently, 88.62 g of isophorone diisocyanate (IPDI) and 0.055 g of dibutyltin dilaurate (DBTDL) were added. The reaction was conducted under moderate stirring at 90° C. under reduced pressure for 2 h in order to obtain an isocyanate-terminated polymer: Measured free NCO content: 3.61%.

To the resultant NCO-terminated polymer were added 0.110 g of dibutyltin dilaurate (DBTDL) and 59.64 g of benzoxazolinone, and the isocyanate groups were depleted by reaction at 110° C. under reduced pressure for 3 h. Measured free NCO content: 0.24%.

Example 5: Impact Modifier SM5 (3,5-Dimethylpyrazole [1.2 Eq.] as Blocking Agent, PolyTHF 2000, Poly bd R45V as Backbone)

225 g of PolyTHF 2000, 225 g of Poly bd R45V and 2.25 g of BHT as stabilizer were dewatered at 90° C. under reduced pressure with minimal stirring for 1 h. Subsequently, 77.82 g of isophorone diisocyanate (IPDI) and 0.058 g of dibutyltin dilaurate (DBTDL) were added. The reaction was conducted under moderate stirring at 90° C. under reduced pressure for 2 h in order to obtain an isocyanate-terminated polymer: Measured free NCO content: 3.08%.

To the resultant NCO-terminated polymer were added 0.116 g of dibutyltin dilaurate (DBTDL) and 38.11 g of 3,5-dimethylpyrazole, and the isocyanate groups were depleted by reaction at 110° C. under reduced pressure for 2 h. Measured free NCO content: 0.0%.

Example 6: Impact Modifier SM6 (Dibutylamine [1.0 Eq.] as Blocking Agent, PolyTHF 2000, Poly bd R45V as Backbone)

175 g of PolyTHF 2000, 175 g of Poly bd R45V and 1.75 g of BHT as stabilizer were dewatered at 90° C. under reduced pressure with minimal stirring for 1 h. Subsequently, 70.56 g of isophorone diisocyanate (IPDI) and 0.046 g of dibutyltin dilaurate (DBTDL) were added. The reaction was conducted under moderate stirring at 90° C. under reduced pressure for 2 h in order to obtain an isocyanate-terminated polymer: Measured free NCO content: 2.90%.

To the resultant NCO-terminated polymer were added 0.92 g of dibutyltin dilaurate (DBTDL) and 37.52 g of dibutylamine, and the isocyanate groups were depleted by reaction at 70° C. under reduced pressure for 3 h. Measured free NCO content: 0.0%.

Example 7: Impact Modifier SM7 (MEKO [1.2 Eq.] as Blocking Agent)

200 g of PolyTHF 2000, 200 g of Poly BD R45V and 2.00 g of BHT as stabilizer were dewatered at 90° C. under reduced pressure with minimal stirring for 1 h. Subsequently, 80.74 g of isophorone diisocyanate (IPDI) and 0.052 g of dibutyltin dilaurate (DBTDL) were added. The reaction was conducted under moderate stirring at 90° C. under reduced pressure for 2 h in order to obtain an isocyanate-terminated polymer: Measured free NCO content: 2.91%.

To the resultant NCO-terminated polymer were added 0.104 g of dibutyltin dilaurate (DBTDL) and 34.82 g of 2-butane oxime (MEKO), and the isocyanate groups were depleted by reaction at 110° C. under reduced pressure for 1 h. Measured free NCO content: 0.00%.

Example 8: Impact Modifier SM8 (2,2-Diallylbisphenol a [1.2 Eq.] as Blocking Agent)

290 g of PolyTHF 2000 and 2.90 g of BHT as stabilizer were dewatered at 90° C. under reduced pressure with minimal stirring for 1 h. Subsequently, 64.25 g of isophorone diisocyanate (IPDI) and 0.046 g of dibutyltin dilaurate (DBTDL) were added. The reaction was conducted under moderate stirring at 90° C. under reduced pressure for 2 h in order to obtain an isocyanate-terminated polymer: Measured free NCO content: 3.36%.

To the resultant NCO-terminated polymer were added 0.092 g of dibutyltin dilaurate (DBTDL) and 104.76 g of 2,2-diallylbisphenol, and the isocyanate groups were depleted by reaction at 110° C. under reduced pressure for 5 h. Measured free NCO content after 5 h: 0.74%. Measured free NCO content the next day at RT: 0.36%.

Example 9: Impact Modifier SM9 (Caprolactam [1.2 Eq.] as Blocking Agent)

200 g of PolyTHF 2000, 200 g of Poly bd R45V and 2.00 g of BHT as stabilizer were dewatered at 90° C. under reduced pressure with minimal stirring for 1 h. Subsequently, 80.74 g of isophorone diisocyanate (IPDI) and 0.053 g of dibutyltin dilaurate (DBTDL) were added. The reaction was conducted under moderate stirring at 90° C. under reduced pressure for 2 h in order to obtain an isocyanate-terminated polymer: Measured free NCO content: 3.026%.

To the resultant NCO-terminated polymer were added 0.106 g of dibutyltin dilaurate (DBTDL) and 47.01 g of caprolactam, and the isocyanate groups were depleted by reaction at 110° C. under reduced pressure for 3 h. Measured free NCO content: 0.00%.

Example Adhesives 1 to 9

The impact modifiers SM1 to SM9 prepared in examples 1 to 9 were each used for production of epoxy resin compositions according to table 2.

Compositions and proportions for epoxy resin compositions containing one of impact modifiers 1 to 9 are summarized in table 2. SM-X relates to the impact modifiers prepared above SM1, SM2, etc.

TABLE 2

| Parts by weight | Chemical composition | Function |
|---|---|---|
| 23.0 | Epoxy resin based on bisphenol A, liquid | Epoxy resin matrix |
| 12.0 | Epoxy resin based on bisphenol A, solid | Epoxy resin matrix |
| 0.5 | p-tert-Butylphenyl glycidyl ether | Reactive diluent |
| 50.0 | Blocked polyurethane, SM-X | Impact modifier |
| 2.43 | Dicyandiamide | Curing agent |
| 0.13 | Urone | Curing agent accelerator |
| 5.0 | $CaCO_3$ | Filler |
| 6.0 | Calcium oxide | Moisture scavenger |
| 8.0 | Fumed silica | Thixotropic agent |

Total: 107.06
Dicy index: 5.50 mol EP/dicy

The respective epoxy resin compositions were mixed in a planetary mixer in a batch size of 350 g. For this purpose, the mixing vessel was filled with the liquid components, followed by the solid components, and they were mixed at 70° C. under reduced pressure. During the mixing operation (about 45 min), the vacuum was broken several times and the mixing tool wiped clean. After a homogeneous mixture had been obtained, the epoxy resin composition was dispensed into cartridges and stored at room temperature.

Tables 3 and 4 show the results of the evaluation of the resultant epoxy resin compositions with the impact modifiers SM1-9.

TABLE 3

(Positive examples)

| Composition | 1 | 2 | 3 | 4 | 5 | 6 | 7 |
|---|---|---|---|---|---|---|---|
| Impact modifier | SM1 | SM2 | SM3 | SM4 | SM5 | SM6 | SM7 |
| Blocking agent | Phenol | HQMME | HQMME | 2-Benzoxazolinone | 3,5-Dimethylpyrazole | Dibutylamine | MEKO |
| Backbone | PolyTHF2000 Poly bd R45V | PolyTHF2000 Poly bd R45V | PolyTHF2000 | PolyTHF2000 | PolyTHF2000Poly bd R45V | PolyTHF2000Poly bd R45V | PolyTHF 2000 PolyBD R45V |
| Max. elongation [mm] | 2.5 | 3.2 | 3.8 | 4.0 | 3.1 | 3.5 | 3.2 |
| Max. force [N] | 3151 | 1933 | 2304 | 3972 | 1178 | 2025 | 2503 |
| Modulus of elasticity [MPa] | 336 | 236 | 256 | 433 | 156 | 183 | 264 |
| Tensile strength [MPa] | 16.5 | 12.9 | 15.0 | 16.4 | 5.6 | 7.9 | 10.6 |
| Elongation at break [%] | 141 | 108 | 154 | 115 | 40 | 83 | 47 |
| LSS [MPa] | 17.1 | 16.1 | 17.1 | 14.6 | 12.1 | 15.2 | 15.8 |
| T-peel [N/mm] | 14.6 | 10.5 | 13.6 | 11.3 | 8.1 | 13.0 | 11.0 |
| I-Peel [N/mm] | 54.2 | 42.4 | 62.8 | 36.5 | 36.4 | 53.7 | 46.0 |
| Viscosity [Pa * s] | | | | | | | |
| 25° C. | 1738 | 1583 | 1470 | 1319 | 1716 | 1534 | 1636 |
| 50° C. | 559 | 497 | 559 | 452 | 603 | 530 | 553 |

TABLE 4

(Negative examples)

| Composition | 8 | 9 |
|---|---|---|
| Impact modifier | SM8 | SM9 |
| Blocking agent | Diallylbis-phenol A | Caprolactam |
| Backbone | PolyTHF2000 | PolyTHF 2000 PolyBD R45V |
| Max. elongation [mm] | 0.5 | 0.4 |
| Max. force [N] | 166 | 179 |
| Modulus of elasticity [MPa] | 402 | 299 |
| Tensile strength [MPa] | 17.4 | 16.6 |
| Elongation at break [%] | 95 | 53 |
| LSS [MPa] | 17.8 | 15.3 |
| T-peel [N/mm] | 7.6 | 5.9 |
| I-Peel [N/mm] RT | 49.4 | 31.0 |

TABLE 4-continued (Negative examples)

| Composition | 8 | 9 |
|---|---|---|
| Viscosity [Pa * s] 25° C. | 6387 | 1652 |
| Viscosity [Pa * s] 50° C. | 1326 | 511 |

Compositions 10-24

Figure 2:
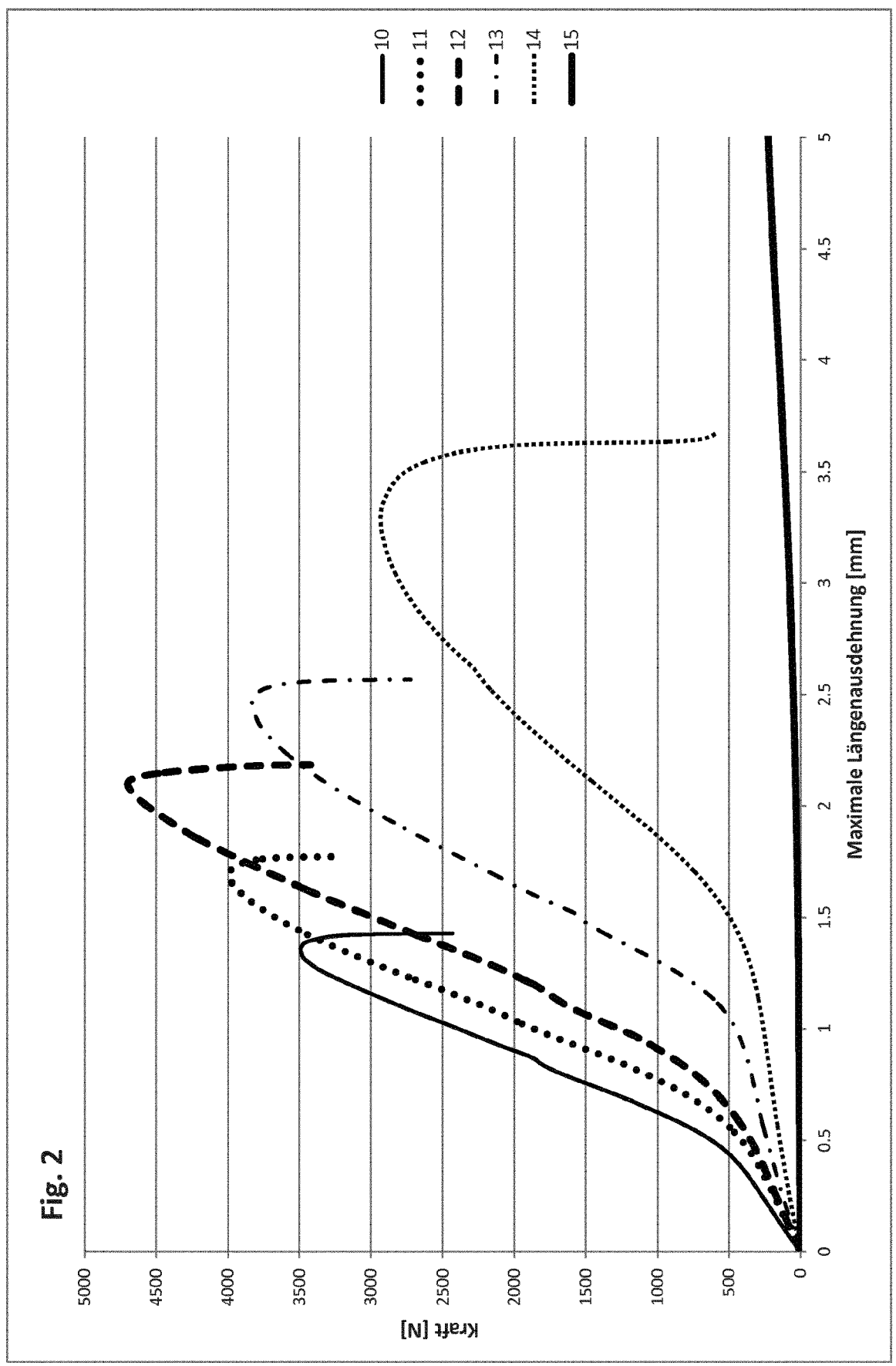

Impact modifiers SM2, SM3 and SM4 were used in different concentrations to produce adhesives according to table 5. The epoxy resin "bisphenol A epoxy resin" used is a mixture of 2 parts liquid epoxy resin based on bisphenol A and one part solid epoxy resin based on bisphenol A.
Tables 6-8 show the results of the evaluation of the resultant adhesives 10-25 with the impact modifiers SM2, SM3 and SM4.
The maximum linear expansion as a function of the proportion of the impact modifier is shown in FIGS. 2 to 4.

TABLE 5

Concentration series with SM2, SM3, SM4, *Weight ratio of epoxy resin A/toughness improver SM

| Composition | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|
| | Parts by weight | | | | | | | | | | | | | | |
| Bisphenol A Epoxy resin | 70 | 60 | 55 | 46 | 30 | 10 | 60 | 55 | 46 | 30 | 10 | 60 | 46 | 30 | 10 |
| Impact modifier SM2 | 10 | 20 | 25 | 34 | 50 | 70 | — | — | — | — | — | — | — | — | — |
| Impact modifier SM3 | — | — | — | — | — | — | 20 | 25 | 34 | 50 | 70 | — | — | — | — |
| Impact modifier SM4 | — | — | — | — | — | — | — | — | — | — | — | 20 | 34 | 50 | 70 |
| Calcium carbonate | 7 | 7 | 7 | 7 | 7 | 7 | 7 | 7 | 7 | 7 | 7 | 7 | 7 | 7 | 7 |
| Calcium oxide | 5 | 5 | 5 | 5 | 5 | 5 | 5 | 5 | 5 | 5 | 5 | 5 | 5 | 5 | 5 |
| Fumed silica | 8 | 8 | 8 | 8 | 8 | 8 | 8 | 8 | 8 | 8 | 8 | 8 | 8 | 8 | 8 |
| Dicyandiamide | 5.77 | 4.95 | 4.54 | 3.79 | 2.47 | 0.82 | 4.95 | 4.54 | 3.79 | 2.47 | 0.82 | 4.95 | 3.79 | 2.47 | 0.82 |
| Urone | 0.30 | 0.26 | 0.24 | 0.20 | 0.13 | 0.04 | 0.26 | 0.24 | 0.20 | 0.13 | 0.04 | 0.26 | 0.20 | 0.13 | 0.04 |
| A/SM* | 7 | 3 | 2.2 | 1.4 | 0.6 | 0.2 | 3 | 2.2 | 1.4 | 0.6 | 0.2 | 3 | 1.4 | 0.6 | 0.2 |

TABLE 6

| Results for compositions 10-15 with SM2 | | | | | | |
|---|---|---|---|---|---|---|
| Composition | 10 | 11 | 12 | 13 | 14 | 15 |
| SM2 pts. by wt. | 10% | 20% | 25% | 34% | 50% | 70% |
| Max. elongation [mm] | 1.40 | 1.70 | 2.16 | 2.40 | 3.30 | 5.20 |
| Max. force [N] | 3415 | 4164 | 4390 | 4072 | 3010 | 265 |
| Modulus of elasticity [MPa] | 1860 | 1560 | 1320 | 966 | 291 | 2 |
| Tensile strength [MPa] | 38.5 | 34.5 | 29.8 | 25.5 | 15 | 1.8 |
| Elongation at break [%] | 4 | 8 | 8 | 19 | 121 | 262 |
| T-peel [N/mm] | 2.6 | 8.9 | 10.9 | 11.4 | 11.3 | 4.8 |
| I-Peel [N/mm] 23° C. | 10.4 | 27.5 | 40.8 | 41.6 | 43.2 | 22.4 |
| I-Peel [N/mm] −30° C. | 4.8 | 26.4 | 33.5 | 44.3 | 51.7 | 41.3 |

TABLE 7

| Results for compositions 16-20 with SM3 | | | | | |
|---|---|---|---|---|---|
| Composition | 16 | 17 | 18 | 19 | 20 |
| SM3 pts. by wt. | 20% | 25% | 34% | 50% | 70% |
| Max. elongation [mm] | 1.6 | 2.1 | 2.3 | 3.8 | Composition uncured |
| Max. force [N] | 2439 | 4459 | 3537 | 2303 | |
| Modulus of elasticity [MPa] | 1430 | 1340 | 913 | 256 | |
| Tensile strength [MPa] | 29.4 | 28.3 | 20.7 | 15 | |
| Elongation at break [%] | 6 | 8 | 14 | 154 | |
| T-peel [N/mm] | 4.9 | 12.2 | 12.9 | 13.6 | |
| I-Peel [N/mm] 23° C. | 34.1 | 44.8 | 52.7 | 62.8 | |
| I-Peel [N/mm] −30° C. | 10.7 | 31.6 | 42.1 | 61.1 | |

TABLE 8

| Results for compositions 21-24 with SM4 | | | | | |
|---|---|---|---|---|---|
| Composition | 21 | 22 | 22 | 23 | 24 |
| SM4 pts. by wt. | 20% | 25% | 34% | 50% | 70% |
| Max. elongation [mm] | 1.6 | 1.9 | 2.2 | 3.2 | Composition uncured |
| Max. force [N] | 3261 | 4047 | 3974 | 3971 | |
| Modulus of elasticity [MPa] | 1200 | 1190 | 914 | 433 | |
| Tensile strength [MPa] | 25.9 | 28.4 | 25.8 | 16.4 | |
| Elongation at break [%] | 7 | 11 | 21 | 115 | |
| T-peel [N/mm] | 2.6 | 3.4 | 7.9 | 11.3 | |
| I-Peel [N/mm] 23° C. | 15.2 | 30.2 | 37.9 | 36.5 | |
| I-Peel [N/mm] −30° C. | 6.3 | 30.5 | 41.6 | 33.8 | |

The invention claimed is:

1. A method comprising:
adding at least one toughness improver D to a one-component thermosetting epoxy resin composition in an amount effective to increase the maximum linear expansion Max. elongation of the one-component thermosetting epoxy resin composition, wherein
the one-component thermosetting epoxy resin composition comprises:
a) at least one epoxy resin A having an average of more than one epoxy group per molecule, and
b) at least one latent curing agent for epoxy resins B;
where the weight ratio of all epoxy resin(s) A having an average of more than one epoxy group per molecule to the at least one toughness improver D is 0.3-2.2;
the toughness improver D is a terminally blocked polyurethane prepolymer of the formula (I):

where
R¹ is a p-valent radical of a linear or branched polyurethane prepolymer terminated by isocyanate groups after the removal of the terminal isocyanate groups,
p has a value of 2 to 8, and
R² is a blocking group which is detached at a temperature above 100° C., where R² is not a substituent selected from the group consisting of

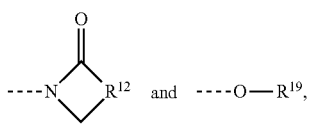

where
R¹² is an alkylene group which has 2 to 5 carbon atoms and optionally has double bonds or is substituted, or is a phenylene group or a hydrogenated phenylene group, especially ε-caprolactam after removal of the NH proton, and
R¹⁹ represents bisphenols, after removal of a hydroxyl group;
the maximum linear expansion Max. elongation is determined in a lap shear test during the cooling of a heated cured lap shear specimen, and
wherein the maximum linear expansion Max. elongation is ≥2.1 mm.

2. The method of claim 1, wherein
R² is independently a substituent selected from the group consisting of

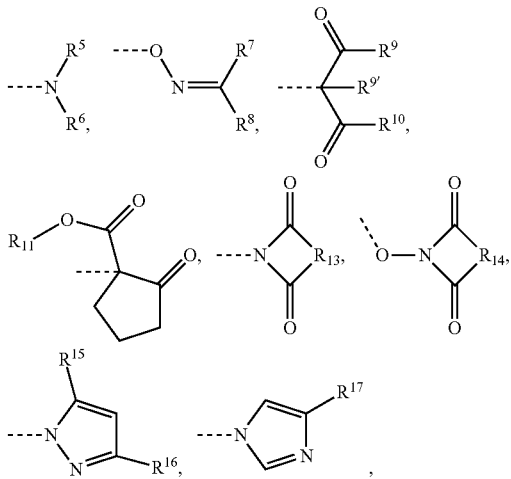

-continued

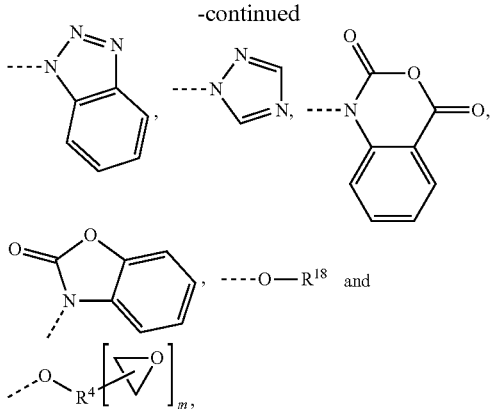

where
R⁵, R⁶, R⁷ and R⁸ are each independently an alkyl or cycloalkyl or aralkyl or arylalkyl group, or R⁵ together with R⁶, or R⁷ together with R⁸, form part of a 4- to 7-membered, optionally substituted ring;
R⁹, R⁹' and R¹⁰ are each independently an alkyl or aralkyl or arylalkyl group or an alkyloxy or aryloxy or aralkyloxy group;
R¹¹ is an alkyl group;
R¹³ and R¹⁴ are each independently an alkylene group which has 2 to 5 carbon atoms and optionally has double bonds or is substituted, or a phenylene group or a hydrogenated phenylene group;
R¹⁵, R¹⁶ and R¹⁷ are each independently H or an alkyl group or an aryl group or an aralkyl group;
R¹⁸ is an aralkyl group or is a mono- or polycyclic, substituted or unsubstituted aromatic group optionally having aromatic hydroxyl groups;
R⁴ is a radical of an aliphatic, cycloaliphatic, aromatic or araliphatic epoxide containing a primary or secondary hydroxyl group after the removal of the hydroxyl and epoxy groups; and
m has a value of 1, 2 or 3.

3. The method of claim 1, wherein
R² is independently a substituent selected from the group consisting of

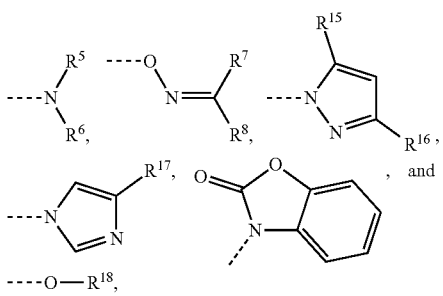

where
R⁵, R⁶, R⁷ and R⁸ are each independently an alkyl or cycloalkyl or aralkyl or arylalkyl group, or R⁵ together with R⁶, or R⁷ together with R⁸, form part of a 4- to 7-membered, optionally substituted ring;
R¹⁵, R¹⁶ and R¹⁷ are each independently H or an alkyl group or an aryl group or an aralkyl group; and
R¹⁸ is an aralkyl group or is a mono- or polycyclic, substituted or unsubstituted aromatic group optionally having aromatic hydroxyl groups.

4. The method of claim 1, wherein the weight ratio of all epoxy resin A having an average of more than one epoxy group per molecule to the at least one toughness improver D is 0.4-2.0.

5. The method of claim 1, wherein R¹ is a p-valent radical of a linear or branched polyurethane prepolymer terminated by isocyanate groups after the removal of the terminal isocyanate groups, and the polyurethane prepolymer is prepared from at least one diisocyanate or triisocyanate and from a polymer $Q_{PM}$ having terminal amino, thiol or hydroxyl groups.

6. The method of claim 5, wherein the polymer $Q_{PM}$ having terminal amino, thiol or hydroxyl groups comprises polyols, each having an average molecular weight that is between 600 and 6000 daltons, the polyols being selected from the group consisting of polyethylene glycols, polypropylene glycols, polyethylene glycol-polypropylene glycol block polymers, polybutylene glycols, polytetramethylene ether glycols, hydroxyl-terminated polybutadienes, hydroxyl-terminated butadiene-acrylonitrile copolymers and mixtures thereof.

7. The method of claim 6, wherein the polymer $Q_{PM}$ having terminal amino, thiol or hydroxyl groups comprises polyols, each having an average molecular weight that is between 600 and 6000 daltons, the polyols being selected from the group consisting of polytetramethylene ether glycols and hydroxyl-terminated polybutadienes, wherein the weight ratio of polytetramethylene ether glycol to hydroxyl-terminated polybutadiene is in the range from 100/0 to 70/30.

8. The method of claim 1, wherein the maximum linear expansion Max. elongation is measured in a lap shear test at a strain rate $V_{st}$ of 0.52 mm/min.

9. The method of claim 1, wherein a temperature of the lap shear specimen in the lap shear test is 190° C. at the start of the measurement and the lap shear specimen is cooled at the start of the measurement at a cooling rate of 40° C/min to a temperature of 25° C. and then left at that temperature.

10. The method of claim 1, wherein the lap shear test is a lap shear test having lap shear test specimens having the following features:
steel sheets having the dimensions of 25 mm×100 mm×1.5 mm,
bonding area of the cured one-component thermosetting epoxy resin composition having the dimensions of 10 mm×25 mm with a thickness of 1.5 mm.

11. The method of claim 1, wherein the maximum linear expansion Max. elongation is ≥2.145 mm.

12. The method of claim 1, wherein a maximum force measured is ≤6000 N.

13. The method of claim 1, wherein a force measured on attainment of the maximum linear expansion Max. elongation of 2.145 mm is ≤4000 N.

14. The method of claim 1, wherein the latent curing agent for epoxy resins B is selected from the group consisting of dicyandiamide, guanidines, anhydrides of polybasic carboxylic acids, dihydrazides and aminoguanidines.

15. The method of claim 1, wherein the one-component thermosetting epoxy resin composition is a thermosetting epoxy resin adhesive, and the method further comprises either
applying the thermosetting epoxy resin adhesive to at least one substrate to bond substrates of a motor vehicle construction, or
applying the thermosetting epoxy resin adhesive to at least one substrate to bond substrates of a sandwich panel construction.

16. The method of claim 1, wherein the weight ratio of all epoxy resin(s) A having an average of more than one epoxy group per molecule to the at least one toughness improver D is 0.5-1.8.

17. The method of claim 1, wherein the weight ratio of all epoxy resin(s) A having an average of more than one epoxy group per molecule to the at least one toughness improver D is 0.6-1.4.

* * * * *